(No Model.)  2 Sheets—Sheet 1.

C. C. NEWTON.
METAL CUTTING OFF AND CENTERING MACHINE.

No. 532,692. Patented Jan. 15, 1895.

FIG. I.

WITNESSES
F. D. Goodwin
W. N. Barr

INVENTOR
Chas. C. Newton
By his Attorneys
Howson & Howson (No Model.) 2 Sheets—Sheet 2.
C. C. NEWTON.
METAL CUTTING OFF AND CENTERING MACHINE.

No. 532,692. Patented Jan. 15, 1895.

WITNESSES

INVENTOR
Chas. C. Newton
By his Attorneys

UNITED STATES PATENT OFFICE.

CHARLES C. NEWTON, OF PHILADELPHIA, PENNSYLVANIA.

METAL CUTTING-OFF AND CENTERING MACHINE.

SPECIFICATION forming part of Letters Patent No. 532,692, dated January 15, 1895.

Application filed February 9, 1894. Serial No. 499,624. (No model.)

*To all whom it may concern:*

Be it known that I, CHARLES C. NEWTON, a citizen of the United States, residing in Philadelphia, Pennsylvania, have invented certain Improvements in Metal Cutting-Off and Centering Machines, of which the following is a specification.

The object of my invention is to construct a machine for simultaneously cutting off both ends of an axle or shaft and centering the same.

Figure 1:
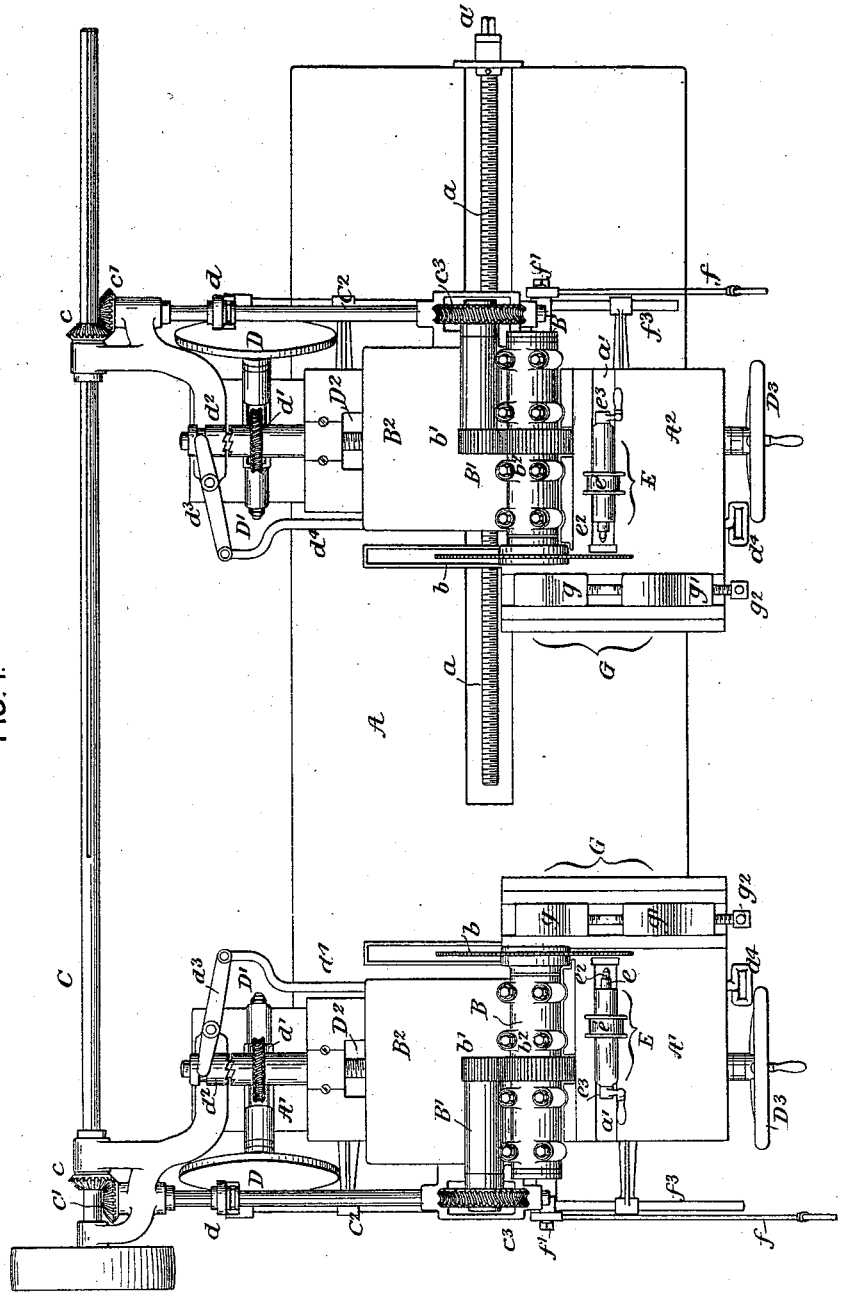
Figure 2:
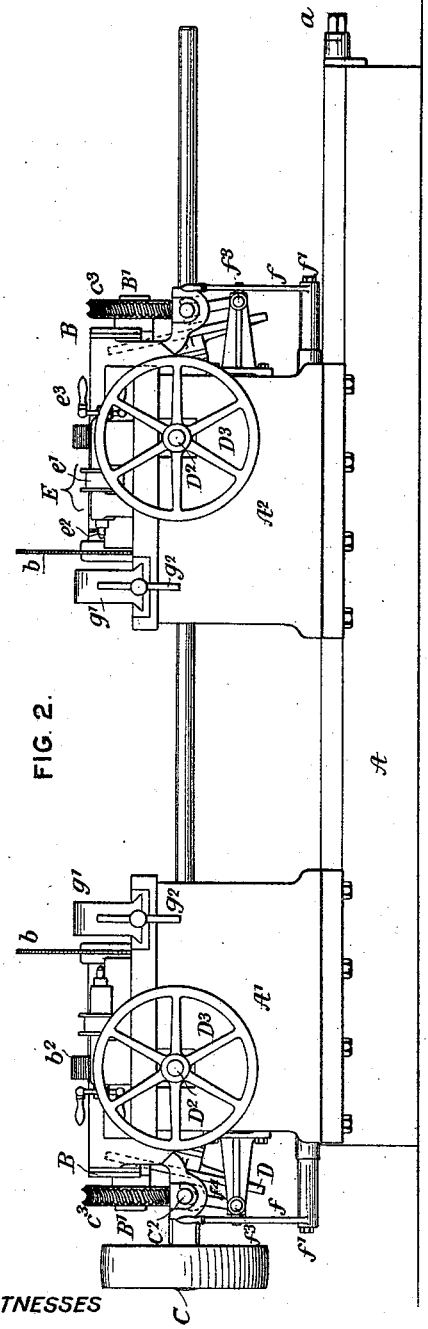
Figure 3:
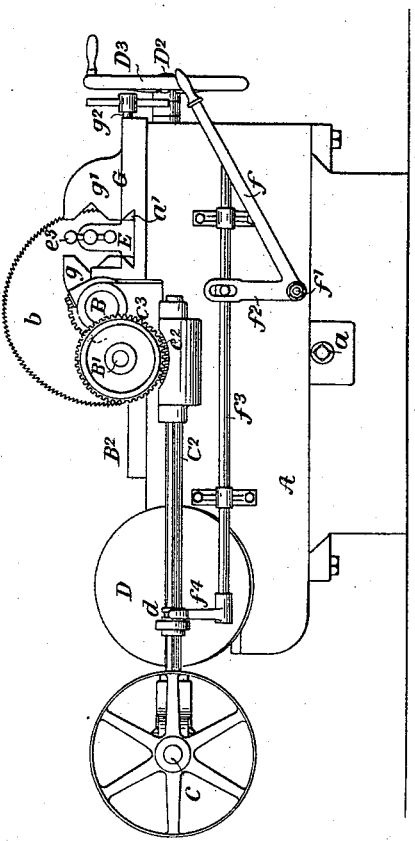

In the accompanying drawings:—Figure 1, is a plan view of a double cutting off and centering machine illustrating my invention. Fig. 2, is a side view; and Fig. 3, is an end view.

A is the bed of the machine on which is a fixed frame A' and an adjustable frame $A^2$ adapted to slide on the bed A. A feed screw $a$ adapted to bearings in the bed A and to a nut on the frame $A^2$ feeds the frame $A^2$ toward or from the fixed head. The head of the screw is shaped to accommodate a wrench or hand wheel. The frame $A^2$ is made adjustable so that different lengths of bars can be cut.

On the stationary frame A' are bearings for the saw mandrel B, to which is clamped the saw $b$. This saw mandrel is driven from a shaft B' by gears $b'$, $b^2$ and the shaft B' is driven from the driving shaft C through the bevel gears $c, c'$, shaft $C^2$, worm $c^2$ and worm wheel $c^3$.

On the shaft $C^2$ is a friction wheel $d$ in frictional contact with a friction disk on a shaft D' inclined in the present instance as shown and adapted to bearings in the fixed frame A'. On this shaft is a worm engaging with a worm wheel $d'$ loose on a screw shaft $D^2$ and on this screw shaft is a clutch sleeve $d^2$ with teeth adapted to engage with the teeth on the hub of the worm wheel so that when the sleeve is thrown into gear by the lever $d^3$, the shaft $D^2$ will be turned by the friction gearing.

The lever has a handle $d^4$ within easy reach of the operator. On the end of the screw shaft $D^2$ is a hand wheel $D^3$ by which the said screw shaft can be turned by hand. The screw shaft passes through a screw threaded lug on the transversely sliding carriage $B^2$ on which the saw spindle is mounted so that the saw will be fed to the work.

In front of the saw spindle is a centering head E adapted to undercut ways $a'$ in the frame A'. This head can be locked in position in the ways and mounted on the mandrel $e$ is a belt pulley $e'$ and in one end of the mandrel is a centering tool which can be fed to the work by turning the handle $e^3$ of the screw feed, similar in construction to the ordinary tail stock of a lathe.

Directly in front of the centering tool is a work clamp G having two jaws $g, g'$. These jaws are adjusted by a screw $g^2$ having a right and left hand thread, one thread adapted to one jaw and the other thread adapted to the other jaw so that the jaws will bring the work always to the center. The feed of the carriage $B^2$ can be regulated by the handle $f$ pivoted at $f'$ and having an arm $f^2$ engaging with a pin on the sliding rod $f^3$ on which is a forked arm $f^4$ engaging with the hub of the friction wheel $d$.

The mechanism above described is duplicated on the carriage $A^2$ with the exception that the bevel gear wheel $c$ is splined to the shaft C, as clearly shown in Fig. 1, so that the driving shaft will always be in gear with the mechanism no matter in what position the sliding frame is in.

The operation of the machine is as follows: If, for instance, an axle is to be cut off and centered the axle blank is placed between the jaws $g, g'$ and clamped. The driving mechanism is then set in motion revolving the two saws and feeding the saws to the work. The saws will gradually cut off the axle to the proper length and after they have cut off the axle the mechanism returns them clear of the axle. The centering spindles are then set in motion and the tools fed to the work so as to center the axle for turning and finishing.

When axles or shafts of different lengths are to be cut the sliding frame $A^2$ is adjusted so that the distance between the saws will be the distance required after which the axle is placed in position to be cut off and centered.

It will be understood that in some instances that a single clamp and a single saw may be used with one centering tool where both ends of a bar are not required to be cut off, but my invention will be generally used on a double machine, as shown in the drawings.

I claim as my invention—

1. The combination in a combined cutting off and centering machine, of the clamp for the axle or bar, a centering tool in a fixed line in respect to the clamp, with a saw adapted to travel in the space between the clamp and centering tool, and mechanism for operating the said saw, the whole being so arranged that when the axle or bar is cut off by the saw the cut end can be centered before it is removed from the clamp, substantially as described.

2. The combination of the reciprocating carriages, saw spindles thereon, saws on said spindles, a fixed clamp for the axle or bar near each saw, and a centering tool beyond each saw and in line with the clamps, with mechanism for driving the saws, substantially as described.

3. The combination of the base of the machine, the two frames one adjustable in respect to the other, a carriage mounted on each frame, a saw spindle and saw carried by the carriage, with means for revolving the saws and feeding the carriages, with stationary clamps for the axle or bar and centering tools in line with the clamp, substantially as described.

4. The combination of the base, the two frames mounted thereon, one adjustable in respect to the other, work clamps on each frame, centering tools in line with the said work clamps, a carriage on each frame adapted to travel toward and from the work clamps, a saw spindle on each carriage and mechanism for driving the saw and mechanism for moving the carriage, substantially as described.

5. The combination of the base, the fixed frame, the sliding frame, a screw for feeding said sliding frame toward or from the fixed frame, work clamps on each frame and an adjustable centering tool in line with each work clamp, a carriage on each frame, a screw for feeding each carriage, a friction feed for said screw, a saw spindle mounted on each carriage, a longitudinal driving shaft geared to the saw spindles and to the feed screws of the carriages, substantially as described.

In testimony whereof I have signed my name to this specification in the presence of two subscribing witnesses.

CHARLES C. NEWTON.

Witnesses:
FRANK BECHTOLD,
WILLIAM A. BARR.